United States Patent
Chung et al.

(10) Patent No.: US 9,619,175 B2
(45) Date of Patent: *Apr. 11, 2017

(54) EMBEDDED MULTIMEDIA CARD (EMMC), HOST FOR CONTROLLING THE EMMC, AND METHODS OF OPERATING THE EMMC AND THE HOST

(71) Applicant: SAMSUNG ELECTRONICS CO., LTD., Suwon-si, Gyeonggi-Do (KR)

(72) Inventors: Woon Jae Chung, Gunpo-si (KR); Song Ho Yoon, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 134 days.

This patent is subject to a terminal disclaimer.

(21) Appl. No.: 14/025,866

(22) Filed: Sep. 13, 2013

(65) Prior Publication Data

US 2014/0089568 A1    Mar. 27, 2014

(30) Foreign Application Priority Data

Sep. 14, 2012  (KR) .......................... 10-2012-0102488

(51) Int. Cl.
*G06F 3/06* (2006.01)
*G06F 12/02* (2006.01)

(52) U.S. Cl.
CPC .......... *G06F 3/0659* (2013.01); *G06F 3/0611* (2013.01); *G06F 3/0679* (2013.01); *G06F 3/0688* (2013.01); *G06F 12/0246* (2013.01)

(58) Field of Classification Search
None
See application file for complete search history.

(56) References Cited

U.S. PATENT DOCUMENTS

| | | | | |
|---|---|---|---|---|
| 5,526,484 A | * | 6/1996 | Casper et al. | 709/237 |
| 6,081,860 A | * | 6/2000 | Bridges | G06F 13/364 |
| | | | | 710/107 |
| 6,323,867 B1 | * | 11/2001 | Nookala et al. | 345/522 |
| 6,496,192 B1 | * | 12/2002 | Shreesha et al. | 345/540 |
| 7,708,195 B2 | | 5/2010 | Yoshida et al. | |
| 8,407,407 B1 | * | 3/2013 | Adler | G06F 3/0613 |
| | | | | 711/103 |
| 2003/0202383 A1 | * | 10/2003 | Shiota | G06F 13/161 |
| | | | | 365/185.33 |
| 2009/0094678 A1 | * | 4/2009 | Floman et al. | 726/2 |
| 2010/0131701 A1 | | 5/2010 | Fujiwara | |
| 2010/0268872 A1 | | 10/2010 | Lee et al. | |

(Continued)

FOREIGN PATENT DOCUMENTS

| | | |
|---|---|---|
| JP | 2003203490 | 7/2003 |
| JP | 2006252079 | 9/2006 |
| KR | 20100120518 A | 11/2010 |

*Primary Examiner* — Jared Rutz
*Assistant Examiner* — Charles Choi
(74) *Attorney, Agent, or Firm* — Volentine & Whitt, PLLC

(57) ABSTRACT

A method of operating an eMMC system includes receiving a first command defining a first operation from the host, and storing the first command in a first command register among N command registers, and receiving a second command defining a second operation from the host, and storing the second command in a second command register among the N command registers, wherein the second command is received while the first operation is being performed.

19 Claims, 17 Drawing Sheets

(56) References Cited

U.S. PATENT DOCUMENTS

| | | |
|---|---|---|
| 2010/0318842 A1* | 12/2010 | Utsuki .............................. 714/6 |
| 2011/0072193 A1 | 3/2011 | Yeh |
| 2011/0145474 A1 | 6/2011 | Intrater |
| 2011/0208905 A1* | 8/2011 | Shaeffer et al. .............. 711/103 |
| 2011/0283165 A1 | 11/2011 | Nishiyama |
| 2012/0159018 A1* | 6/2012 | Bar-Shalom et al. .......... 710/48 |
| 2012/0159646 A1 | 6/2012 | Hong Chi et al. |
| 2013/0019053 A1* | 1/2013 | Somanache et al. ......... 711/103 |
| 2013/0151776 A1* | 6/2013 | Edelhaeuser et al. ........ 711/118 |

\* cited by examiner

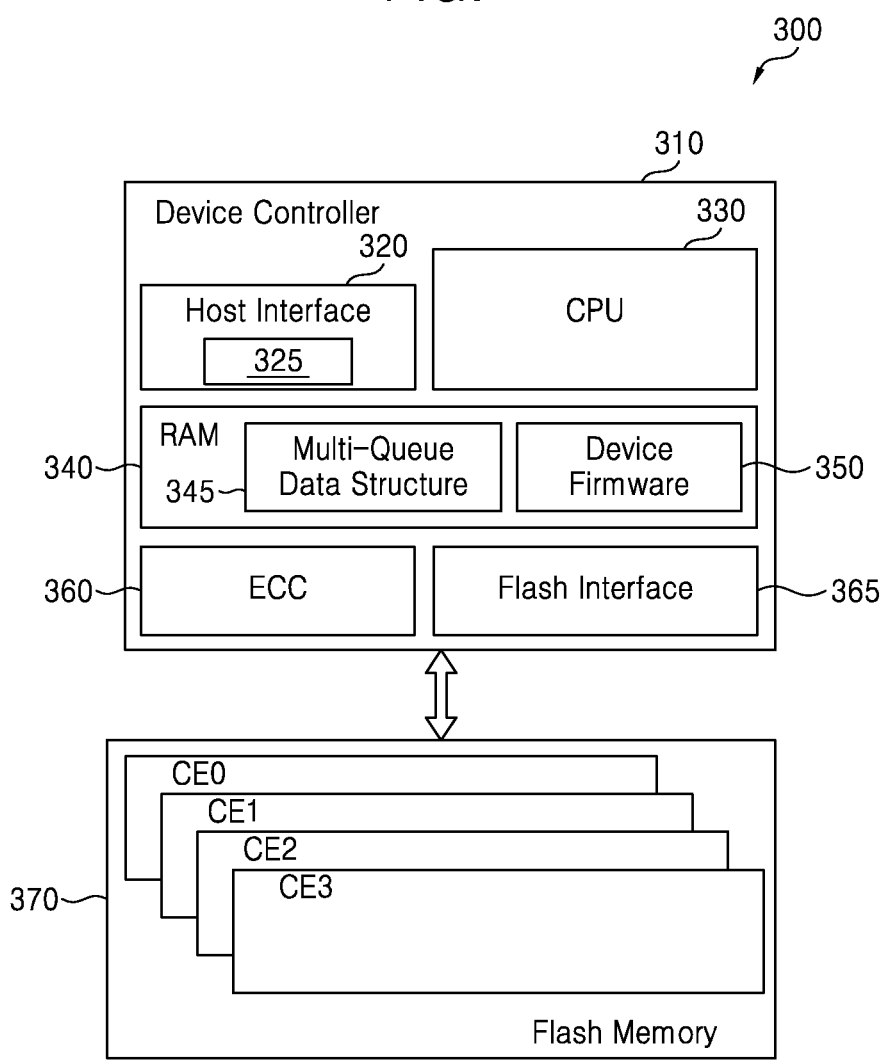

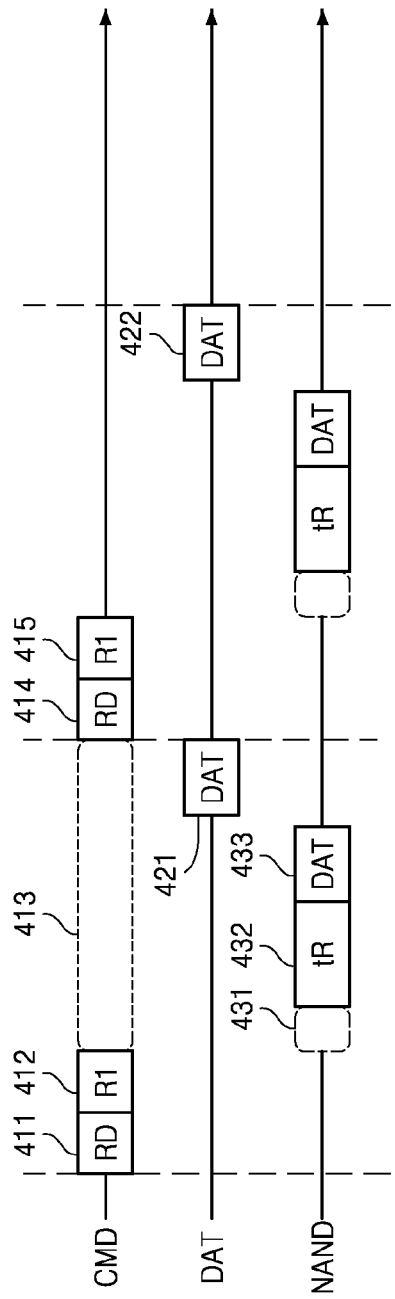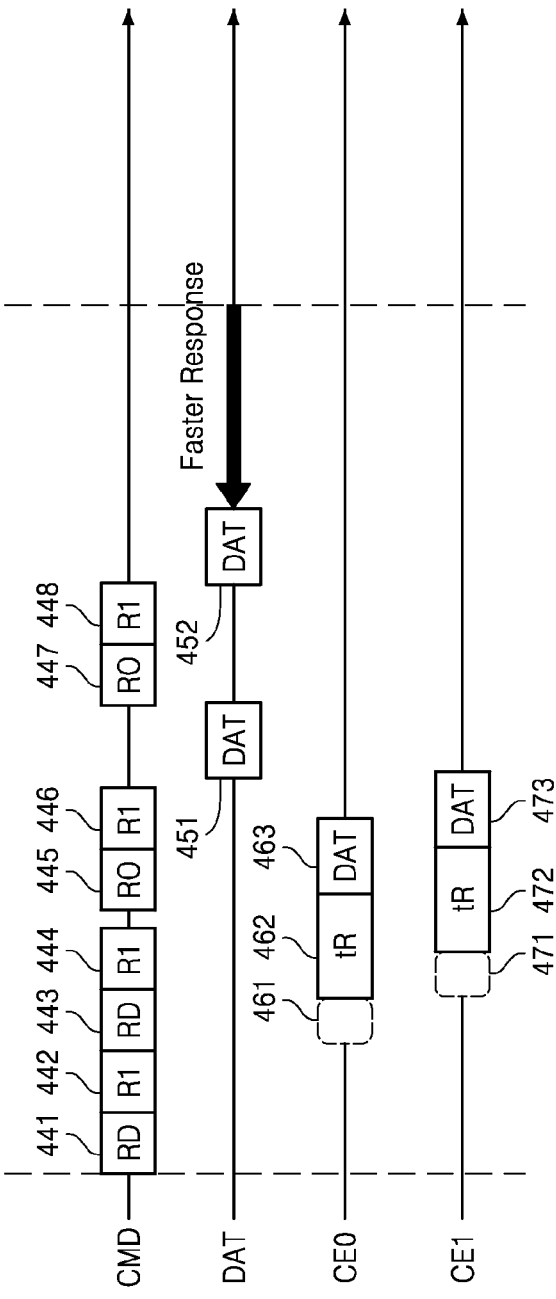
FIG. 8A
FIG. 8B

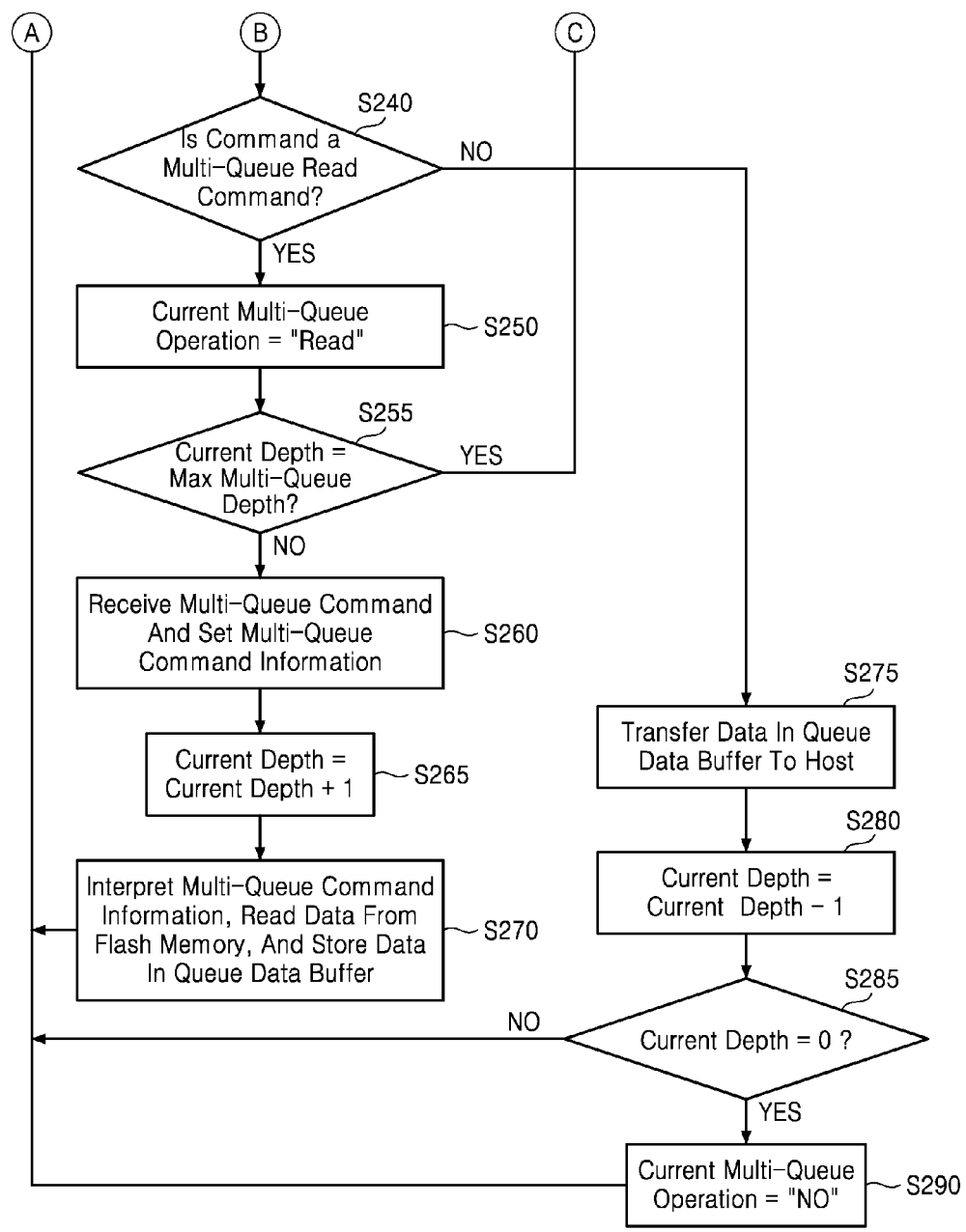

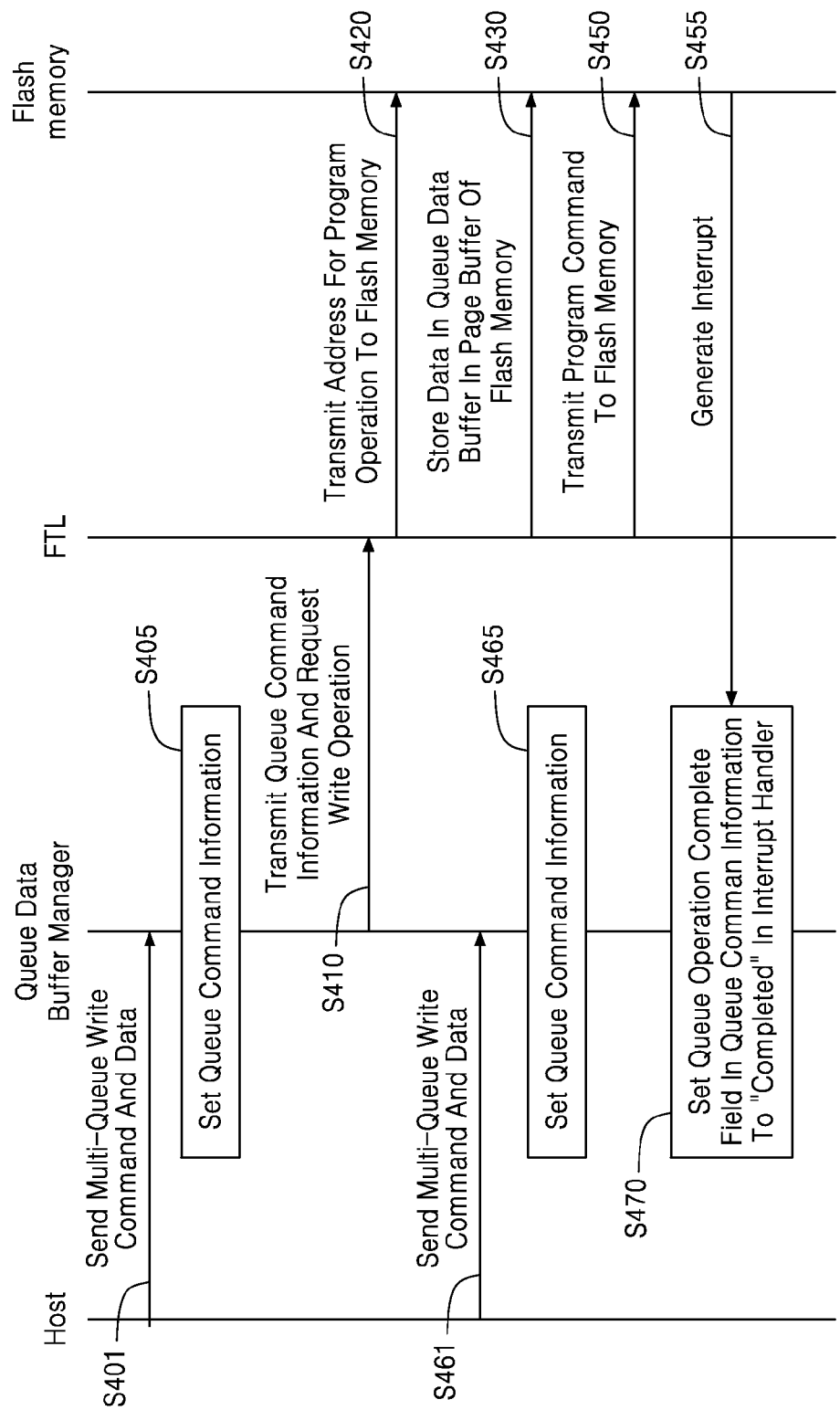

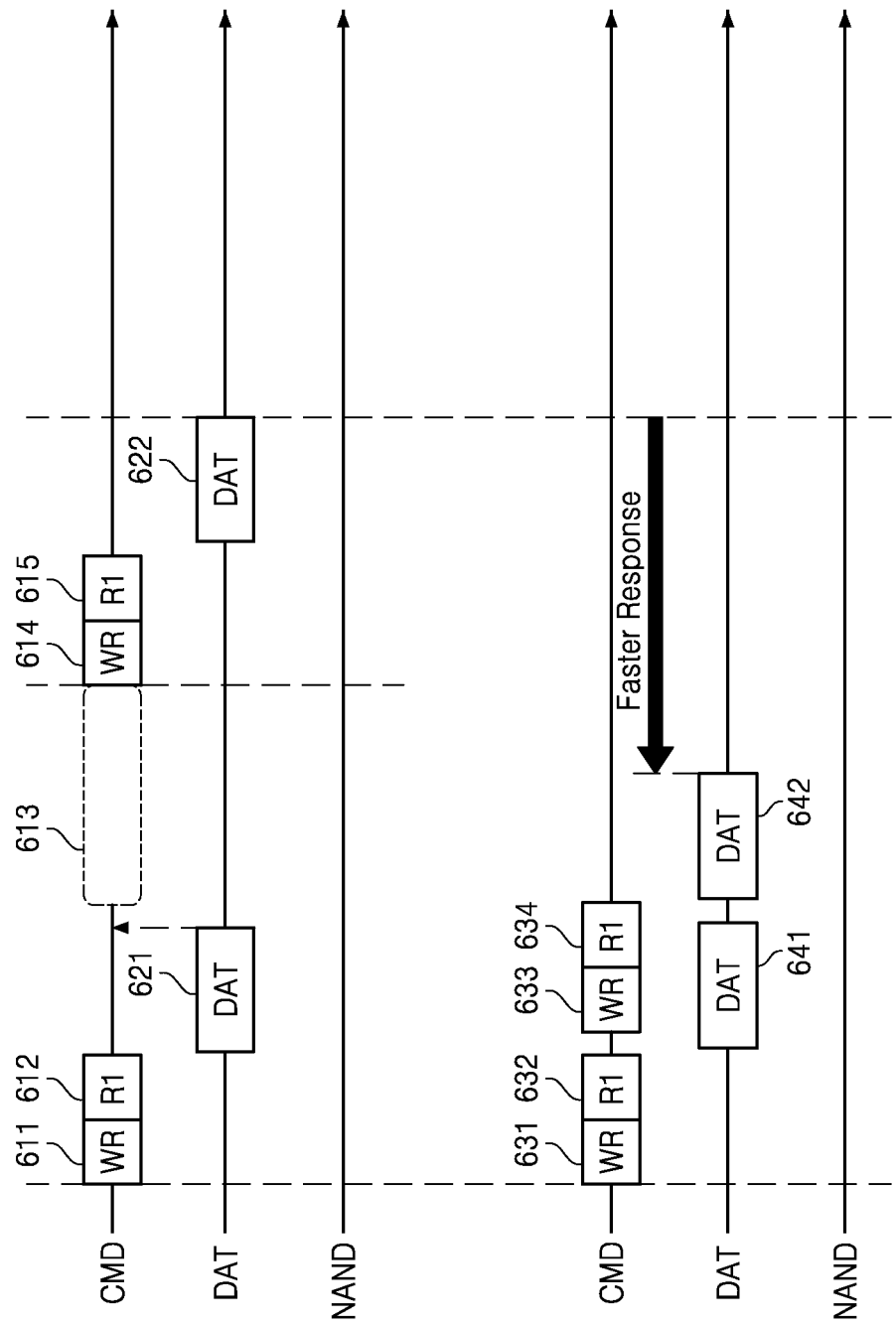

an eMMC with a multi-queue read operation according to embodiments of the inventive concept;

EMBEDDED MULTIMEDIA CARD (EMMC), HOST FOR CONTROLLING THE EMMC, AND METHODS OF OPERATING THE EMMC AND THE HOST

CROSS-REFERENCE TO RELATED APPLICATIONS

This application claims priority under 35 U.S.C. §119(a) from Korean Patent Application No. 10-2012-0102488 filed on Sep. 14, 2012, the disclosure of which is hereby incorporated by reference in its entirety.

BACKGROUND

The inventive concept relates generally to embedded Multimedia Cards (eMMCs), eMMC systems including an EMMC and a host, and methods of operating eMMC systems. More particularly, the inventive concept relates to eMMCs, eMMC systems and methods of eMMC operation that are capable of securing an improved data valid window for data received by a host by directly correcting input timing for the data signals provided by the eMMC.

The so-called multimedia card (MMC) is a flash memory card standard. The eMMC is an embedded MMC standard defined by the Joint Electron Devices Engineering Council (JEDEC). In general configuration and application eMMCs are designed to be inserted (or "embedded") in conjunction with a host within mobile communication devices such as smart phones. Conventionally, the eMMC communicates data signals, control signals, commands, clock(s) and/or power signals with the connected host in accordance with a standardize ten (10) signal line bus.

SUMMARY

According to certain embodiments of the inventive concept, there is provided an embedded multimedia card (eMMC) comprising; a flash memory, and an eMMC controller configured to receive a first command from a host, and while performing a first operation in response to the first command to receive a second command from the host and store the second command.

According to certain embodiments of the inventive concept, there is provided a method of operating an embedded multimedia card (eMMC) system including a host and an eMMC connected via a clock line, a command/response line, and a data bus, the method comprising; receiving a first command defining a first operation from the host, and storing the first command in a first command register among N command registers, where "N" is an integer greater than 1, and receiving a second command defining a second operation from the host, and storing the second command in a second command register among the N command registers, wherein the second command is received while the first operation is being performed

BRIEF DESCRIPTION OF THE DRAWINGS

FIG. 2 is a block diagram further illustrating the eMMC of FIG. 1 according to embodiments of the inventive concept;

FIGS. 8A and 8B are an operating diagram comparing a conventional read operation that may be performed by an eMMC with a multi-queue read operation according to embodiments of the inventive concept;

FIGS. 9A and 9B are a flowchart summarizing execution of a multi-queue read operation according to embodiments of the inventive concept;

FIG. 13 is an operating diagram further illustrating the multi-queue write operation of FIGS. 12A and 12B; and FIG. 14, inclusive of FIGS. 14A and 14B, is an operating diagram comparing a conventional packet write operation with a multi-queue write operation that may be performed using eMMC systems according to embodiments of the inventive concept.

DETAILED DESCRIPTION

Figure 1:
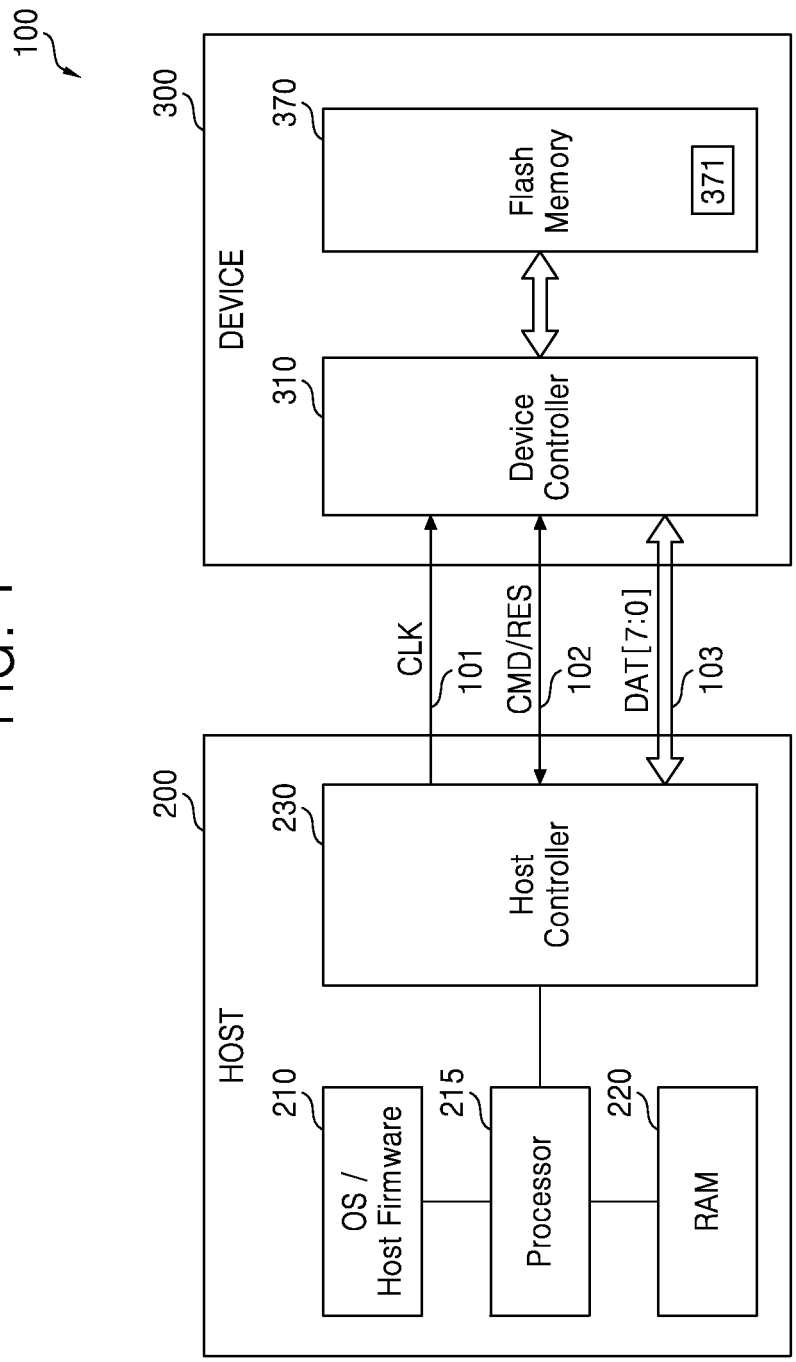
FIG. 1 is a block diagram of an embedded multimedia card (eMMC) system according to embodiments of the inventive concept.

Embodiments of the inventive concept will now be described in some additional detail with reference to the accompanying drawings. The inventive concept may, however, be embodied in many different forms and should not be construed as being limited to only the illustrated embodiments. Rather, these embodiments are provided so that this disclosure will be thorough and complete, and will fully convey the scope of the invention to those skilled in the art. Throughout the written description and drawings, like reference numbers and labels denote like or similar elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Those skilled in the art will understand that various JEDEC standards are available that characterize and/or define the structure, constitution and/or operating conditions of eMMCs. These standards may be readily obtained and consulted by recourse to http://www.jedec.org. For example, the embedded multimedia card (eMMC) electrical standard, version 4.51 published June 2012 (i.e., JESD84-B451) contains many terms and technical definitions that are useful to an understanding of the inventive concept.

Various embodiments of the inventive concept may include at least one "additional" signal line or signal wire (hereafter, simply "line") having a specific purpose. This additional line will be additive to the standard 10-wire configuration(s) specified by JEDEC. The provision of an additional line within certain embodiments of the inventive concept increases noise immunity and improves transmission speed for data communicated between a host and a device during a data read operation while operating in a dual data rate (DDR) mode. Those skilled in the art will understand the general technical concepts and design options involved in providing a DDR mode of operation—specifically including so-called "DDR 400". In this regard, pending U.S. patent application [U.S. Attorney Docket No. SEC.3341 claiming priority to Korean Patent Application No. 10-2012-0102467 filed on Sep. 14, 2012] is hereby incorporated by reference.

Within various embodiments of the inventive concept, the term "channel" is used to denote a signal path enabling the transmission of one or more electrical signal(s) (e.g., a voltage). As will be understood by those skilled in the art, a channel may include one or more of; circuits acting upon the one or more electrical signal(s), a host pad (and/or pin), an eMMC pad (and/or pin), a line (or collection of lines), a driver—specifically including but not limited to certain differential amplifiers, and a receiver—specifically including but not limited to certain differential amplifiers.

FIG. 1 is a block diagram of an eMMC system 100 according to embodiments of the inventive concept. The eMMC system 100 includes a host 200 and a device (e.g., an eMMC) 300. The host 200 may control data processing operations such as a data read operation and a data write operation. The data processing operations may be performed at a single data rate (SDR) or a DDR.

The host 200 may be a data processing device, such as a central processing unit (CPU), a processor, a microprocessor, or an application processor, which can process data. The data processing device may be embedded or implemented in an electronic device. The electronic device may be implemented as a personal computer (PC), a laptop computer, a mobile telephone, a smart phone, a tablet PC, a personal digital assistant (PDA), an enterprise digital assistant (EDA), a digital still camera, a digital video camera, an audio device, a portable multimedia player (PMP), a personal navigation device or portable navigation device (PND), an MP3 player, a handheld game console, or an e-book.

The eMMC 300 may be electrically connected with the electronic device through connection means (e.g., pads, pins, buses, or communication lines) to communicate with the host 200A.

The host 200 may include a processor 215, a memory 220, and a host controller 230. An operating system (OS)/host firmware 210 may be driven by the processor 215. The host 200 may also include a clock generator (not shown) and a state control unit (not shown). The clock generator generates a clock signal CLK used in the host 200 and the eMMC 300. The clock generator may be implemented by a phase locked loop (PLL).

The processor 215 may be hardware that controls the generation of a command CMD, the analysis of a response RES, the process of data stored in an extended card specific data (CSD) register (or an EXT_CSD register) 371, and/or the process of other data. The processor 215 may drive the OS/host firmware 210 to perform these operations.

The host controller 230 interfaces with the eMMC 300. The host controller 230 issues the command CMD to the eMMC 300, receives the response RES to the command CMD, transmit write data to the eMMC 300, and receives read data from the eMMC 300.

The eMMC buses illustrated in FIG. 1 may include a conventional signal bus including ten (10) signal lines described in the referenced JEDEC standard above. That is the bus connecting the eMMC 300 and the host 200 of FIG. 1 may include a clock line 101, command/response line 102, and an eight (8) line data bus 103. However, the inventive concept is not restricted thereto. For instance, eMMC buses may also include a unidirectional return clock bus (not shown) that transmits a return clock signal (not shown) from the eMMC 300 to the host 200.

The clock line 101 transmits the clock signal CLK. The bidirectional command/response line 102 transmits the command CMD to the eMMC 300 and transmits the response RES to the command CMD to the host 200. The bidirectional data bus 103 transmits write data DAT[7:0] to the eMMC 300 for the data write operation and transmits read data DAT[7:0] to the host 200 for the data read operation.

The host 200 may transmit a hardware reset signal to the eMMC 300 through a reset line (not shown). The host 200 may generate operating voltages necessary for the operations of the eMMC 300 and transmit them to the eMMC 300.

FIG. 2 is a block diagram further illustrating the eMMC 300 of FIG. 1 according to embodiments of the inventive concept. The eMMC 300 includes a device (eMMC) controller 310 and a flash memory 370.

The eMMC controller 310 controls data communication between the host 200 and the flash memory 370. The eMMC controller 310 includes an eMMC host interface 320, a CPU 330, a memory 340, an error correction code (ECC) block 360, and a flash interface 365.

The eMMC host interface 320 receives the clock signal CLK and the command CMD from the host 200, analyzes the command CMD, generates the response RES according to an analysis result, and transmits the response RES and data generated based on the response RES to the host 200. The eMMC host interface 320 includes a command register 325 for a multi-queue read operation and/or a multi-queue write operation.

Figure 3A:
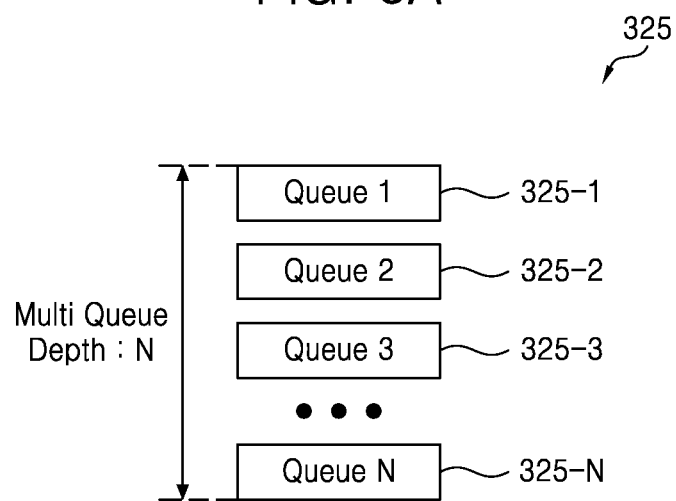
FIG. 3A is a diagram further illustrating the command register of FIG. 2 according to embodiments of the inventive concept.

FIG. 3A is a diagram further illustrating one possible example of the command register 325 of FIG. 2 according to embodiments of the inventive concept. The command register 325 includes "N" registers 325-1 through 325-N, where N is a natural number greater than 1, and where the value of "N" indicates a size (or "multi-queue depth") of the command register 325 (i.e., the number of registers included in the command register 325). Accordingly, the eMMC host interface 320 may receive as many multi-queue commands as the maximum multi-queue depth of the host 200 allows, and may store the multi-queue commands in the registers 325-1 through 325-N, respectively.

A multi-queue command is one or more particular command(s) predefined between the host 200 and the eMMC 300 to allow a command received from the host 200 to be stored in the eMMC 300 so that before an operation corresponding to a previous command or a current command is completed (e.g., before a read operation or a write operation being performed by the flash memory 370 is completed). The multi-queue command may include a multi-queue read command for reading data from the eMMC 300, a multi-queue write command for writing data to the eMMC 300, and a data read-out command for transmitting data read in response to the multi-queue read command to the host 200. However, the inventive concept is not restricted thereto.

The registers 325-1 through 325-N store information (hereinafter, referred to as command information) about a multi-queue command issued from the host 200. For instance, the eMMC host interface 320 may store queue 1 command information about a first multi-queue command in the first register 325-1 and store queue 2 command information about a second multi-queue command in the second register 325-2. In this manner, the eMMC host interface 320 may store command information about up to N multi-queue commands in the registers 325-1 through 325-N.

Figure 3B:
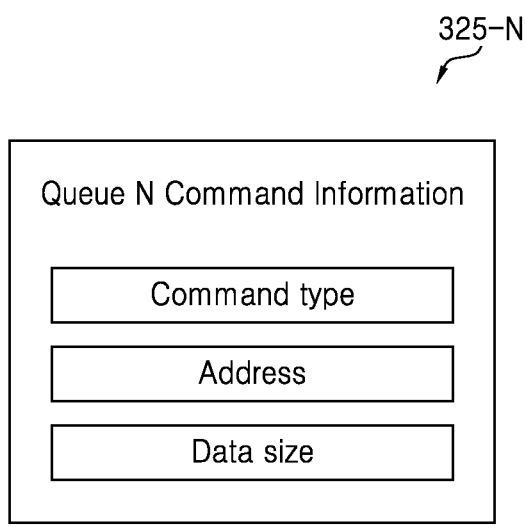
FIG. 3B is a diagram further illustrating the multi-queue command information stored in the register of FIG. 3A according to embodiments of the inventive concept.

FIG. 3B is a diagram further illustrating in one possible example multi-queue command information that may be stored in the register 325-N of FIG. 3A according to embodiments of the inventive concept. The multi-queue command information may include a command type, an address, and a data size, but the inventive concept is not restricted to the current embodiments. The command type, the address, and the data size may be included in a multi-queue command issued by the host 200 and transferred to the eMMC 300.

The command type is a field indicating a type of command and includes a multi-queue read command and a multi-queue write command. In other words, the command type indicates whether a multi-queue command is a read command or a write command. The address indicates an address at which the multi-queue command is executed. The data size indicates the size of data on which the multi-queue command is executed. For instance, when the multi-queue command is a read command, the address is 100, and the data size is 1024, it may instruct to read data of 1024 bytes at an address of 100. However, the unit of a data size is not restricted to bytes. A different unit such as the number of blocks or pages of a predetermined size may be used.

The CPU 330 controls the operations of the interfaces 320 and 365 and controls the overall operation of the eMMC 300. The memory 340 temporarily stores data transferred between the interfaces 320 and 365. The memory 340 may be implemented by non-volatile memory. The memory 340 may store a multi-queue data structure 345 and a device firmware 350. The device firmware 350 may be stored in the memory 340 and executed by the CPU 330. Examples of the device firmware 350 and multi-queue data structure 345 will be described with reference to FIGS. 4 and 5.

Returning to FIG. 2, the flash memory 370 may be used to store data. When the flash memory 370 is implemented by NAND flash memory, the flash interface 365 may be implemented by a NAND flash interface. The flash memory 370 includes the EXT_CSD register 371 that stores device properties and selected modes.

The device 300 may also include a host control register (not shown) in addition to the EXT_CSD register 371. The host control register is a register which the host 200 can control or set using a command or the like.

The flash memory 370 may include a plurality of memory elements CE0 through CE3. Although four (4) memory elements CE0 through CE3 are illustrated in FIG. 2, the inventive concept is not restricted to this particular number. The flash memory 370 may have a structure that supports at least two channels. The host 200 may issue a SEND_EXT_CSD command (=CMD8) to read the EXT_CSD register 371. The eMMC 300 transmits as a data block the EXT_CSD register 371 which is 512 bytes in length. A multi-queue depth may be set in a reserved field of the EXT_CSD register 371. Alternatively, the multi-queue depth may be set in another host control register (not shown).

Figure 4:
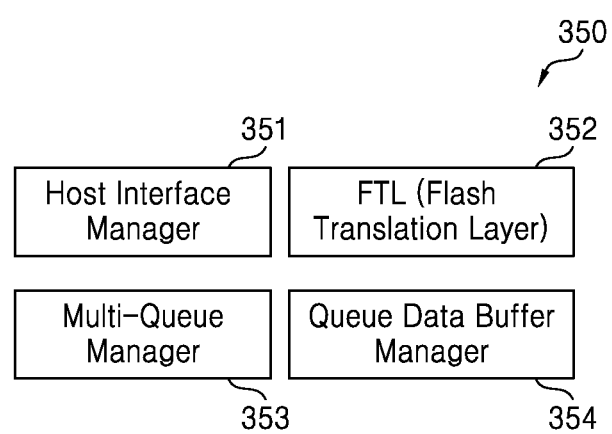
FIG. 4 is a block diagram of one possible structure for eMMC firmware according to embodiments of the inventive concept.

FIG. 4 is a block diagram illustrating one possible example of the structure of the eMMC firmware 350 according to embodiments of the inventive concept. The eMMC firmware 350 includes a host interface manager 351, a flash translation layer (FTL) 352, a multi-queue manager 353, a queue data buffer manager 354.

The host interface manager 351 controls a protocol for communication of data and information with the host 200. When a host interface is assumed to be a standard eMMC 4.5 compliant interface, the host interface manager 351 may be implemented and operated according to the eMMC 4.5 JEDEC specification referenced above. The FTL 352 is a module that reads/writes data from/to the flash memory 370. The FTL 352 translates an address requested by the host 200 considering that the read, program and erase units of the flash memory 370 are different from one another, and performs a read/write operation requested by the host on the flash memory 370.

When the host 200 sends a multi-queue read command and a multi-queue write command to the eMMC 300, the multi-queue manager 353 manages multi-queue read command information and multi-queue write command information. The queue data buffer manager 354 manages queue data buffers (346-1 through 346-M in FIG. 5 where M is a natural number of at least 2) which stores data related with a multi-queue command.

Figure 5:
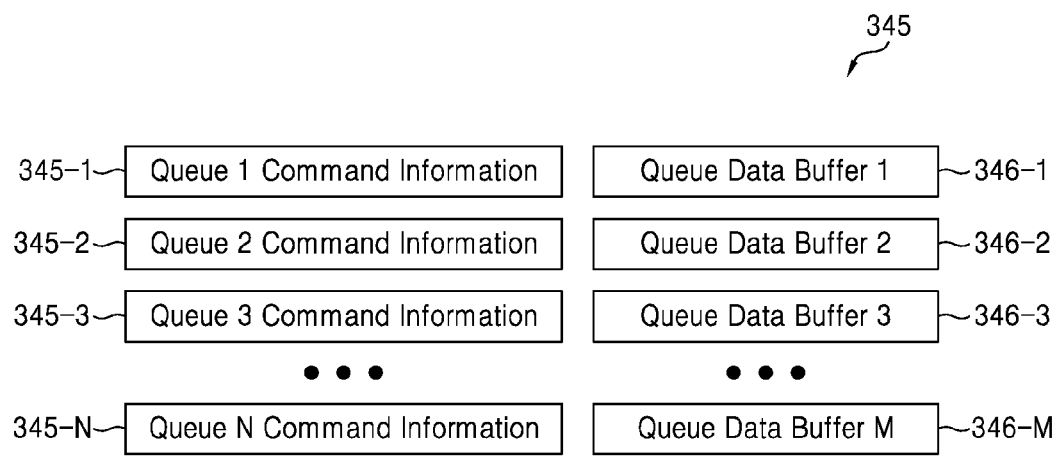
FIG. 5 is a diagram further illustrating the multi-queue data structure of in FIG. 2 according to embodiments of the inventive concept.

FIG. 5 is a diagram further illustrating the multi-queue data structure 345 of FIG. 2 according to embodiments of the inventive concept. The multi-queue data structure 345 includes command information items 345-1 through 345-N and queue data buffers 346-1 through 346-M.

Multi-queue read command information and multi-queue write command information is managed as multi-queue command information including queue 1 command information through queue N command information within the multi-queue data structure 345 of the memory 340.

Figure 6:
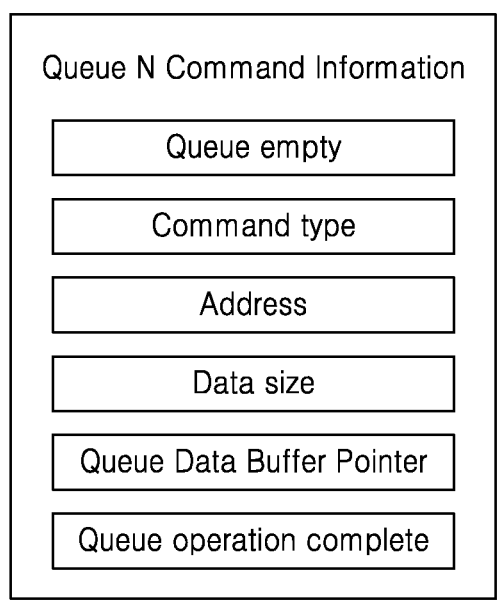
FIG. 6 is a diagram further illustrating the multi-queue command information stored in the multi-queue data structure of FIG. 5 according to embodiments of the inventive concept.

FIG. 6 is a diagram further illustrating multi-queue command information that may be stored in the multi-queue data structure 345 of FIG. 5 according to embodiments of the inventive concept. The multi-queue command information in the multi-queue data structure 345 may further include "queue empty", "queue data buffer pointer", and "queue operation complete" in addition to the command type, the address, and the data size which are illustrated in FIG. 3B. However, the inventive concept is not restricted to this particular configuration.

"Queue empty" is register occupancy information indicating whether a register is empty or occupied. For instance, "queue empty" in the queue N command information may indicate whether the Nth register 325-N is empty or it has stored a command (i.e., it is occupied).

"Queue data buffer pointer" is a pointer indicating a buffer that includes data on which a multi-queue read command or a multi-queue write command is executed. It points at one of the M queue data buffers 346-1 through 346-M in the multi-queue data structure 345. For instance, when the command type in the queue N command information is a multi-queue read command, "queue data buffer pointer" in the queue N command information may be address information of a queue data buffer (one of the queue data buffers 346-1 through 346-M in FIG. 5) in which data read from the flash memory 370 in response to the multi-queue read command has been stored.

"Queue operation complete" is information indicating that a multi queue command has been completely processed. For instance, when the command type in the queue N command information is a multi-queue read command, "queue operation complete" in the queue N command information indicates that the host 200 is allowed to read data from the queue data buffers 346-1 through 346-M.

Until power is applied to the eMMC 300 and the host 200 sends a multi-queue command to the eMMC 300, "queue empty" is set as "empty" in the multi-queue data structure 345 and command type, address, data size, queue data buffer pointer, and queue operation complete is all meaningless.

As described above, multi-queue command information may be managed using a hardware structure (e.g., a multi-queue command register), managed as a data structure in the memory 340, or managed using a combination of the hardware structure and the data structure.

Figure 7:
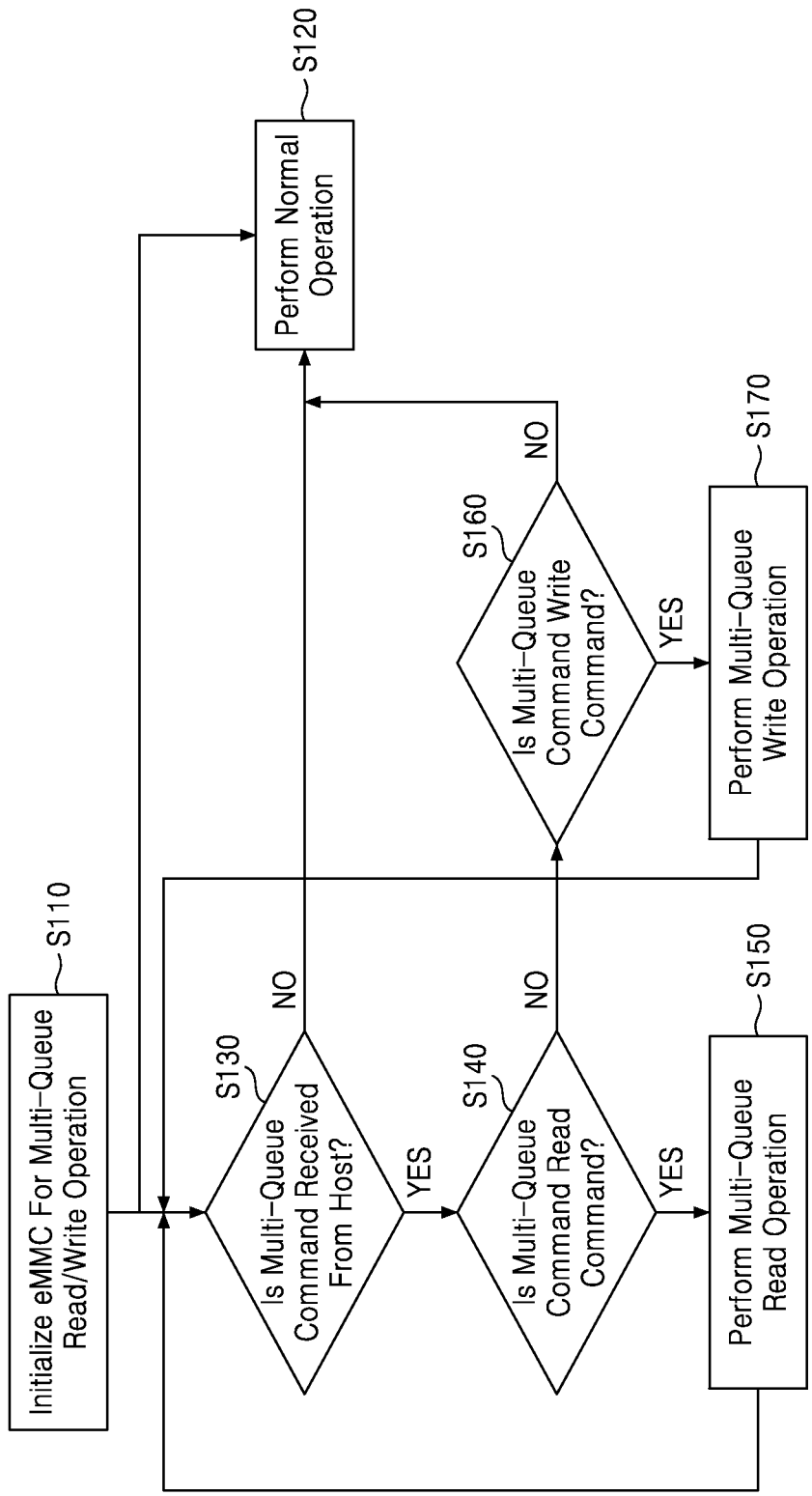
FIG. 7 is a flowchart summarizing one possible method of operating an eMMC according to embodiments of the inventive concept.

FIG. 7 is a flowchart summarizing one possible method of operating the eMMC 300 of FIG. 2 according to embodiments of the inventive concept. First, the eMMC 300 is initialized for a multi-queue read/write operation (S110). That is, before a multi-queue command may be executed, the command register 325 and the multi-queue data structure 345 must be initialized. In certain embodiments of the inventive concept, a competent initialization operation may be performed upon power-up of the eMMC 300, or following reset of the eMMC 300.

Next, a determination is made as to whether a multi-queue command has been received from the host 200 (S130). If not (S120=NO), a "normal" operation is performed (S120). Here, the term "normal operation" (and corresponding term "normal command") is used to distinguish all operations that are not multi-queue operations (and "multi-queue commands").

When it is determined that the multi-queue command is received from the host 200 (S130=YES), it is sequentially determined whether the multi-queue command is a multi-queue read command (S140) or a multi-queue write command (S160). When it is determined that the multi-queue command is the multi-queue read command (S140=YES), a multi-queue read operation is performed (S150), and when it is determined that the multi-queue command is the multi-queue write command (S160=YES), a multi-queue write operation is performed (S170).

FIG. 8, inclusive of FIGS. 8A and 8B, is an operating diagram that compares a normal read operation performed by the eMMC with a multi-queue read operation in accordance with embodiments of the inventive concept. FIG. 8A shows certain signal line states (e.g., CMD, DAT and NAND) for the normal read operation, FIG. 8B shows analogous signal line states for the multi-queue read operation.

Referring to FIG. 8A, when a host sends a data read command RD or 411 to the eMMC via the command/response line 102, the eMMC returns a response R1 or 412 to the data read command RD or 411 to the host via the command/response line 102. The eMMC prepares to read data from a flash memory NAND in response to the data read command RD or 411 (431), reads data from flash memory cells (432 and 433), and transmits the "read data" 421 to the host via the data bus 103. In this normal read operation, the host can send a subsequent data read command RD or 414 only after receiving the data 421 corresponding to the data read command RD or 411. Accordingly, the host is forced to wait (period 413) until receiving the data 421 since receiving the response R1 or 412 to the data read command RD or 411.

In contrast, referring to FIG. 8B, the host 200 sends a first multi-queue read command RD or 441 to the eMMC 300. The eMMC 300 sends to the host 200 a response R1 or 442 to the first multi-queue read command RD or 441. Also, the eMMC 300 reads data from the flash memory CE0 in response to the first multi-queue read command RD or 441 (461 and 462) and stores data 463 in the first queue data buffer 346-1.

Upon receiving the response R1 or 442 from the eMMC 300, the host 200 sends a second multi-queue read command RD or 443. In other words, the host 200 may send the second multi-queue read command RD or 443 for reading next data to the eMMC 300 during a time period in which data corresponding to the first multi-queue read command RD or 441 is being retrieved, but has not yet been received.

The eMMC 300 sends a response R1 or 444 to the second multi-queue read command RD or 443 to the host 200 and also reads data from the flash memory CE1 in response to the second multi-queue read command RD or 443 (471 and 472) and stores data 473 in the second queue data buffer 346-2.

In this manner, the host 200 may send as many multi-queue read commands as a maximum multi-queue depth N. For instance, when the multi-queue depth N is 4, the host 200 may send up to four (4) multi-queue read commands in succession. The multi-queue depth N may be stored in the EXT_CSD register 371 of the eMMC 300. The host 200 may read the EXT_CSD register 371 using a particular command, e.g., a SEND_EXT_CSD command, and recognize the multi-queue depth N.

Thus, the eMMC 300 may read data from the flash memory 370 in relation to commands being executed "in parallel" (i.e., in at least a partially overlapping manner). For instance, the eMMC 300 may perform operations 461 through 463 that read data from the first memory element CE0 of the flash memory 370 in parallel with performing operations 471 through 473 that read data from the second memory element CE1 of the flash memory 370, thereby implementing a multi-plane read operation.

The host 200 sends a data read-out command RO or 445 to the eMMC 300 in order to read out the data 451 stored in the first queue data buffer 346-1. The eMMC 300 sends a response R1 or 446 to the data read-out command RO or 445 and also transfers the data 451 stored in the first queue data buffer 346-1 to the host 200 through the data buses 103. At this time, the data 451 transferred may be data 463 read from the flash memory CE0 in response to the first multi-queue read command RD or 441. The data read-out command RO or 445 may be a command newly defined between the host 200 and the eMMC 300 for a multi-queue read/write operation according to some embodiments of the inventive concept.

The host 200 sends a data read-out command RO or 447 to the eMMC 300 in order to read out the next data 452 stored in the second queue data buffer 346-2. The eMMC 300 sends a response R1 or 448 to the data read-out command RO or 447 and also transfers the data 452 stored in the second queue data buffer 346-2 to the host 200 through the data buses 103. At this time, the data 452 transferred may be data 473 read from the flash memory CE1 in response to the second multi-queue read command RD or 443.

As described above, according to the embodiments of the inventive concept, the idle time conventionally apparent between commands may be markedly reduced so that read performance is increased. In other words, the eMMC 300 receives multi-queue read commands in advance and makes preparations for read operations (e.g., preparations of reading data from the flash memory 370 and storing the data in the queue data buffers 346-1 through 346-M) at a time or in parallel, thereby increasing the read performance.

Figure 9A:
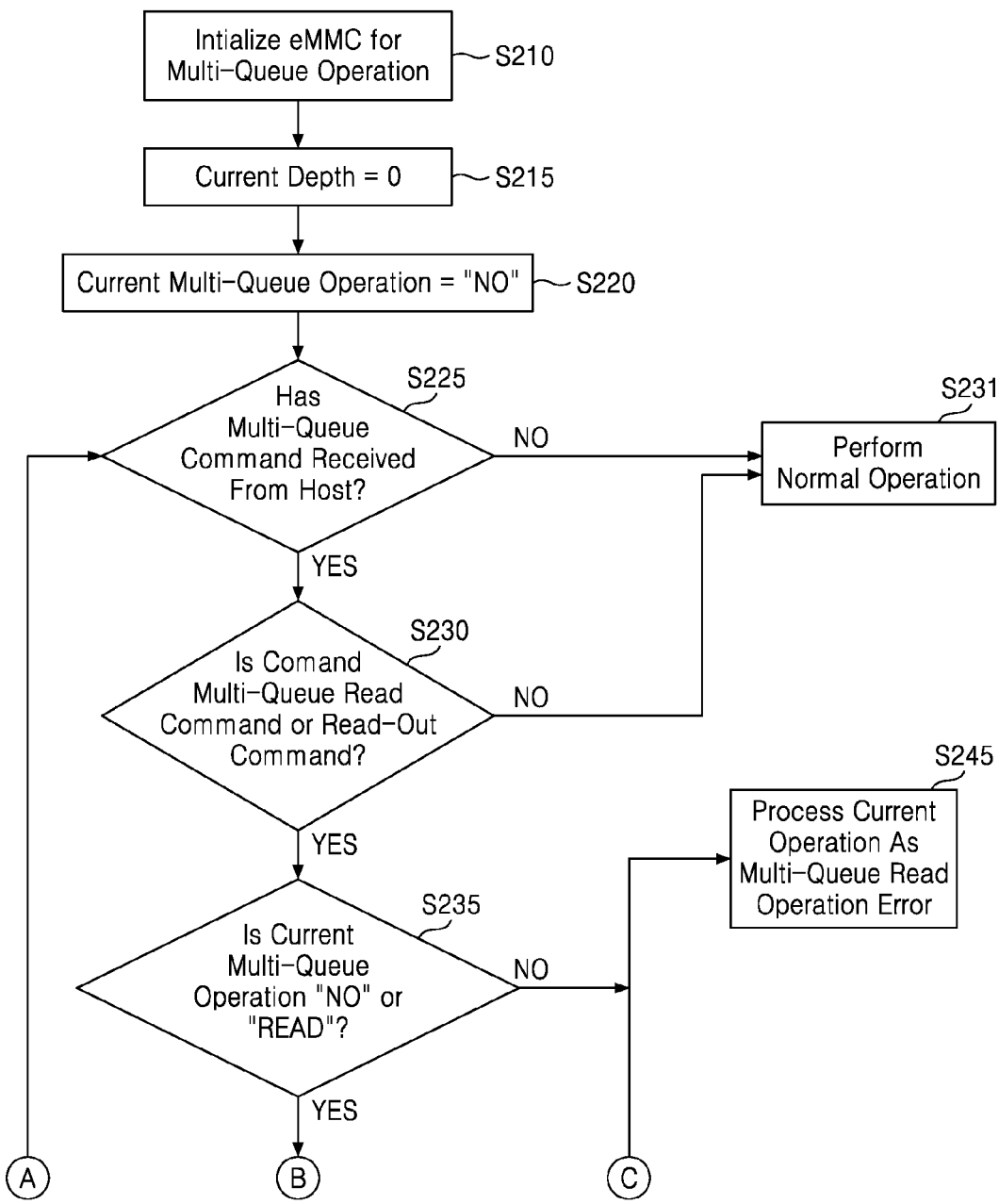

FIG. 9, inclusive of FIGS. 9A and 9B, is a flowchart summarizing one possible method of executing a multi-queue read operation with the eMMC system 100 of FIG. 1 according to embodiments of the inventive concept. The method of FIG. 9 may be implemented using firmware.

Again, the eMMC 300 is initialized for a multi-queue operation (S210). That is, the command register 325 and multi-queue data structure 345 are initialized. A current multi-queue depth is initialized to a value of '0' (S215), and a current multi-queue operation flag is set to "NO" (S220). The current multi-queue operation flag being set to "NO" means that a multi-queue operation is not currently being performed and the eMMC 300 may perform a "normal read/write operation" (S231). From this initialized state, the eMMC 300 will determines whether a multi-queue command has been received from the host 200 (S225), and if yes, (S225=YES), will then determine whether the multi-queue command is one of a multi-queue read command or a multi-queue read-out command (S230).

When the received multi-queue command is determined to be one of the multi-queue read command or the multi-queue read-out command (S230=YES), then the eMMC 300 determines whether the current multi-queue operation flag is set to one of "NO" or "READ" (S235). Upon determining at this stage that the current multi-queue operation is not one a "NO" or a "READ" (S235=NO), the eMMC 300 will process the current operation as a multi-queue read operation error (S245).

However, when the multi-queue command is one of a multi-queue read command or a multi-queue read-out command (S230=YES) and the current multi-queue operation is "NO" or "READ" (S235=YES), then a determination is made as to whether the received multi-queue command is a multi-queue read command (S240). Upon so determining (S240=YES), the state of the current multi-queue operation is set to "read" (S250), and the eMMC 300 verifies whether the current multi-queue depth is equal to a maximum multi-queue depth (S255). If the current multi-queue depth is equal to the maximum multi-queue depth, the eMMC 300 processes the current operation as a multi-queue read operation error (S245).

However, when the current multi-queue depth is not equal to the maximum multi-queue depth (S255=NO) (i.e., the current multi-queue depth remains less than maximum multi-queue depth), the eMMC 300 receives the multi-queue read command from the host 200 and sets multi-queue command information (S260). The eMMC 300 then increases the current multi-queue depth by 1 (S265), and the eMMC 300 interprets the multi-queue command information using the queue data buffer manager 354, obtains read data from the flash memory 370, and stores the read data in one of the queue data buffers 346-1 through 346-M (S270).

The immediately foregoing may be understood as a "multi-queue read operation case." However, when the received command is a data read-out command (S240=NO), a "multi-queue read-out operation case" is performed. For example, the eMMC 300 may cause the queue data buffer manager 354 to transfer read data that has been temporarily stored in one of the queue data buffers 346-1 through 346-M to the host 200 (S275). Then, the eMMC 300 decreases the current multi-queue depth by 1 (S280), determines whether the current multi-queue depth is 0 (S285), and sets the current multi-queue operation flag to "NO" (S290) when the current multi-queue depth is 0.

The exemplary method may continue back through the loops beginning at S225 and moving through S270, S285, or S290. Those skilled in the art will appreciate that two or more the operations described above may be performed in parallel.

Figure 10:
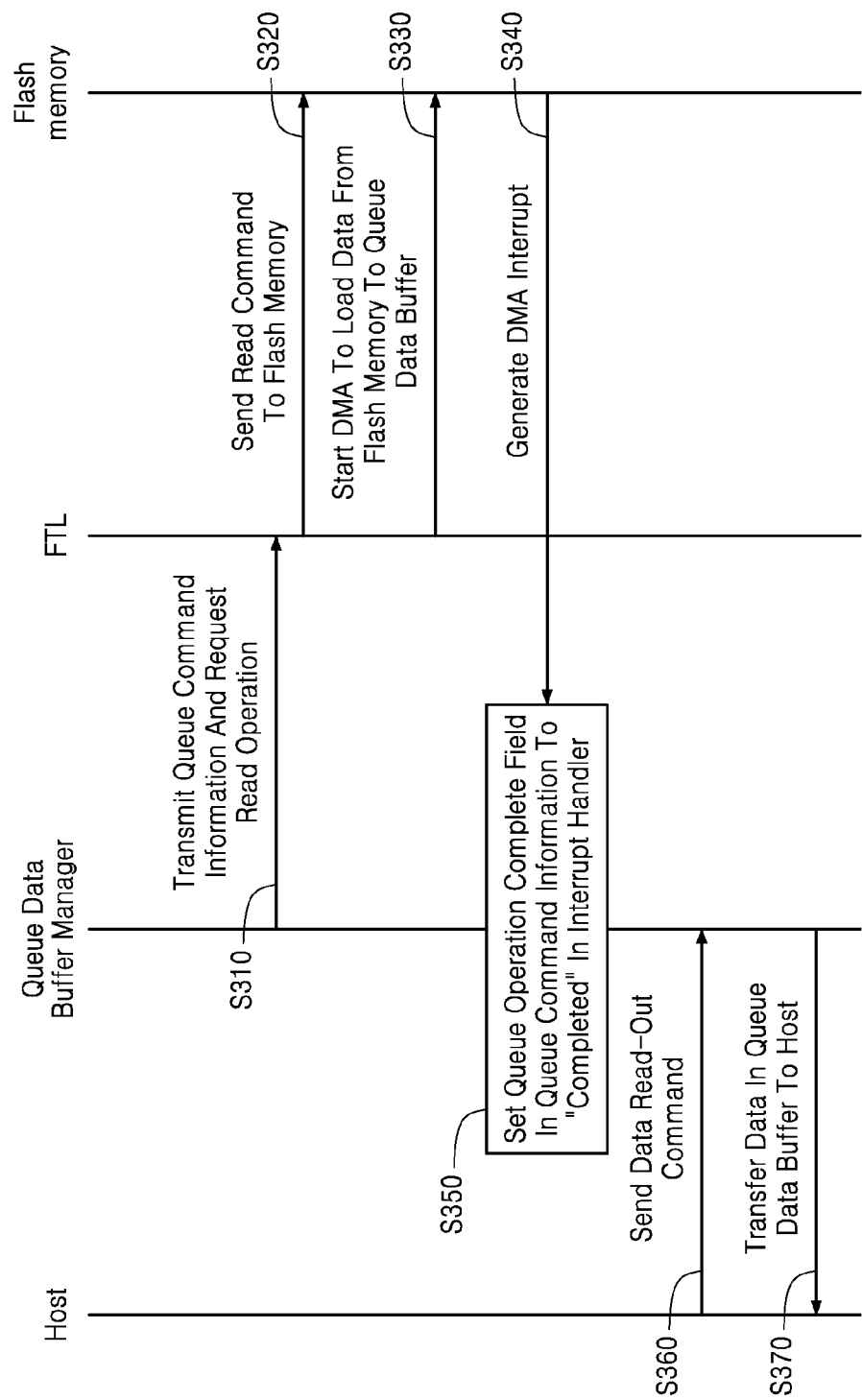
FIG. 10 is an operating diagram further illustrating the method of FIG. 9.

FIG. 10 is an operating diagram that further illustrates a method that may be implemented by firmware execution of the method illustrated in FIG. 9 according to embodiments of the inventive concept. First, a queue data buffer manager transmits queue command information to an FTL and requests a data read operation (S310). The FTL sends a read command to a flash memory (320). At this time, the read command may be a multi-plane read command.

The FTL then starts a direct memory access (DMA) (S330) in order to load data from a page buffer of the flash memory to a queue data buffer. After the completion of the DMA, the flash memory generates a DMA interrupt (S340). Then, a "queue operation complete" field in the queue command information is set to "completed" by an interrupt handler (S350). In certain embodiments of the inventive concept, operations S310 through S350 may be sub-operations performed with the operation S270 of FIG. 9.

However, when a data read-out command is received from a host (S360), the data in the queue data buffer is merely transferred to the host (S370).

Figures 11A, 11B:
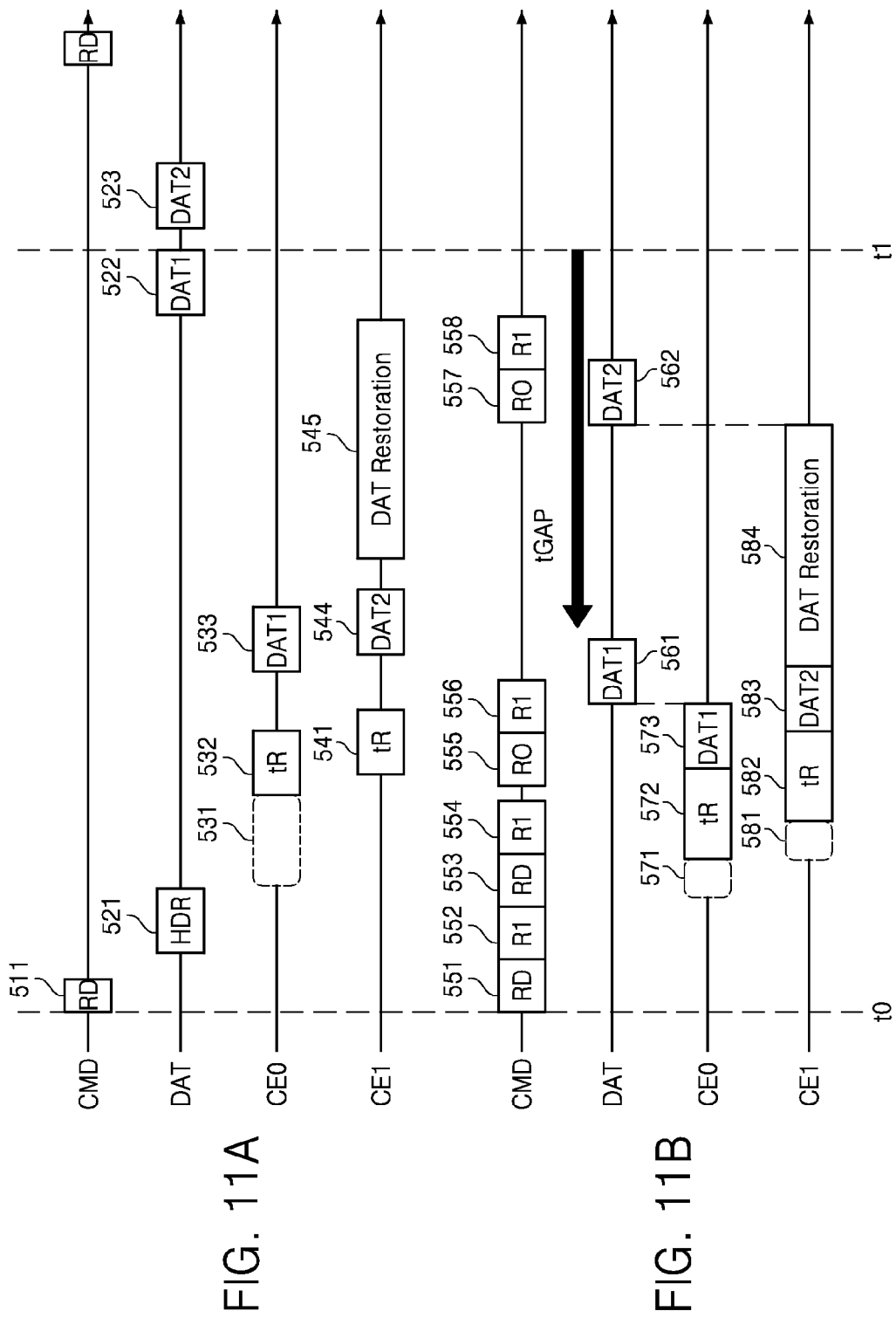
FIGS. 11A and 11B are an operating diagram comparing a conventional packet read operation with a multi-queue read operation that may be performed using eMMC systems according to embodiments of the inventive concept.

FIG. 11, inclusive of FIGS. 11A and 11B, illustrates an operating diagram that compares a conventional packet read operation with a multi-queue read operation according to embodiments of the inventive concept. FIG. 11A shows certain signal lines states for the conventional packet read operation, and FIG. 11B shows analogous signal lines states for the multi-queue read operation according to embodiments of the inventive concept.

Referring FIGS. 1 and 11A, a host sends a data read command RD or 511 to an eMMC through a command/response line 102 and a packed command HDR or 521 to the eMMC through data bus 103. The eMMC parses and interprets the packed command HDR or 521 (531), accesses the flash memory chip CE0 and reads first data DAT1 (532 and 533), accesses the flash memory chip CE1 and reads second data DAT2 (542 and 543). Although not shown, the first and second data DAT1 and DAT2 are checked for errors. When an error occurs in the second data DAT2, the second data DAT2 is restored using error correction.

During In the packet read operation, even when an error occurs only in the second data DAT2 and no errors occur in the first data DAT1, the first and second data DAT1 and DAT2 can be transferred to the host (522 and 523) only after the second data DAT2 is restored.

However, referring to FIGS. 1 and 11B, the host 200 sends a first multi-queue read command RD or 551 to the eMMC 300. The eMMC 300 sends to the host 200 a response R1 or 552 to the first multi-queue read command RD or 551. In response to the first multi-queue read command RD or 551, the eMMC 300 reads data from the flash memory CE0 (571 and 572) and stores the data in the first queue data buffer 346-1 (573).

Upon receiving the response R1 or 552 from the eMMC 300, the host 200 sends a second multi-queue read command RD or 553 to the eMMC 300. The eMMC 300 sends to the host 200 a response R1 or 554 to the second multi-queue read command RD or 553. In response to the second multi-queue read command RD or 553, the eMMC 300 reads data from the flash memory CE1 (581 and 582) and stores the data in the second queue data buffer 346-2 (583).

In this manner, the host 200 can send as many multi-queue read commands as a maximum multi-queue depth N. For instance, when the multi-queue depth N is 4, the host 200 may send up to four multi-queue read commands.

When an error occurs in the second data DAT2 read from the flash memory CE1, the ECC block 360 of the eMMC 300 restores the second data DAT2 using error correction (584). Before the second data DAT2 is completely restored, that is, regardless of the second data DAT2, the host 200 sends a data read-out command RO or 555 to the eMMC 300 in order to read the first data DAT1 stored in the first queue data buffer 346-1. The eMMC 300 sends to the host 200 a response R1 or 556 to the data read-out command RO 555. The eMMC 300 also transfers the data DAT1 stored in the first queue data buffer 346-1 to the host 200 through the data bus 103 (561).

After the second data DAT2 is restored, the host 200 sends a data read-out command RO or 557 to the eMMC 300 in order to read the second data DAT2 stored in the second queue data buffer 346-2. In response to the data read-out command RO or 557, the eMMC 300 sends a response R1 or 558 and also transfers the second data DAT2 stored in the second queue data buffer 346-2 to the host 200 through the data bus 103 (562).

As described above, when data restoration is necessary due to an error in data read by the eMMC 300, the host can read data from the eMMC only after preparation of data including data restoration is completed in the packet read operation. However, according to the embodiments of the inventive concept, the host 200 can read data from the eMMC 300 per read command, and therefore, even when data restoration is necessary with respect to an $(N-K)^{th}$ read command among N multi-queue read commands, the host 200 can read data corresponding to the first through $(N-K-1)^{th}$ read commands from the eMMC 300.

Figure 12A:
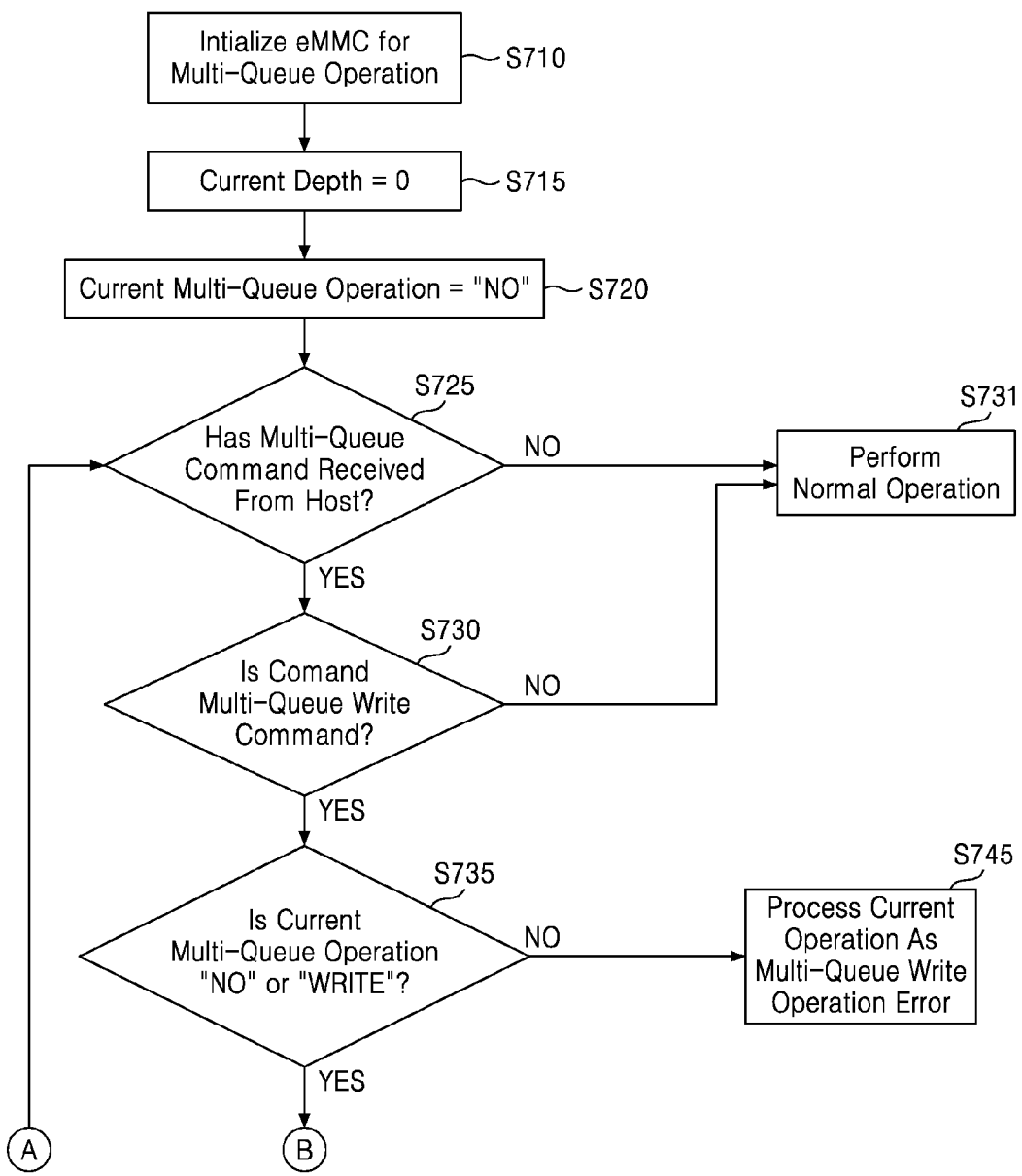
FIGS. 12A and 12B are a flowchart summarizing execution of a multi-queue write operation according to embodiments of the inventive concept.
Figure 12B:
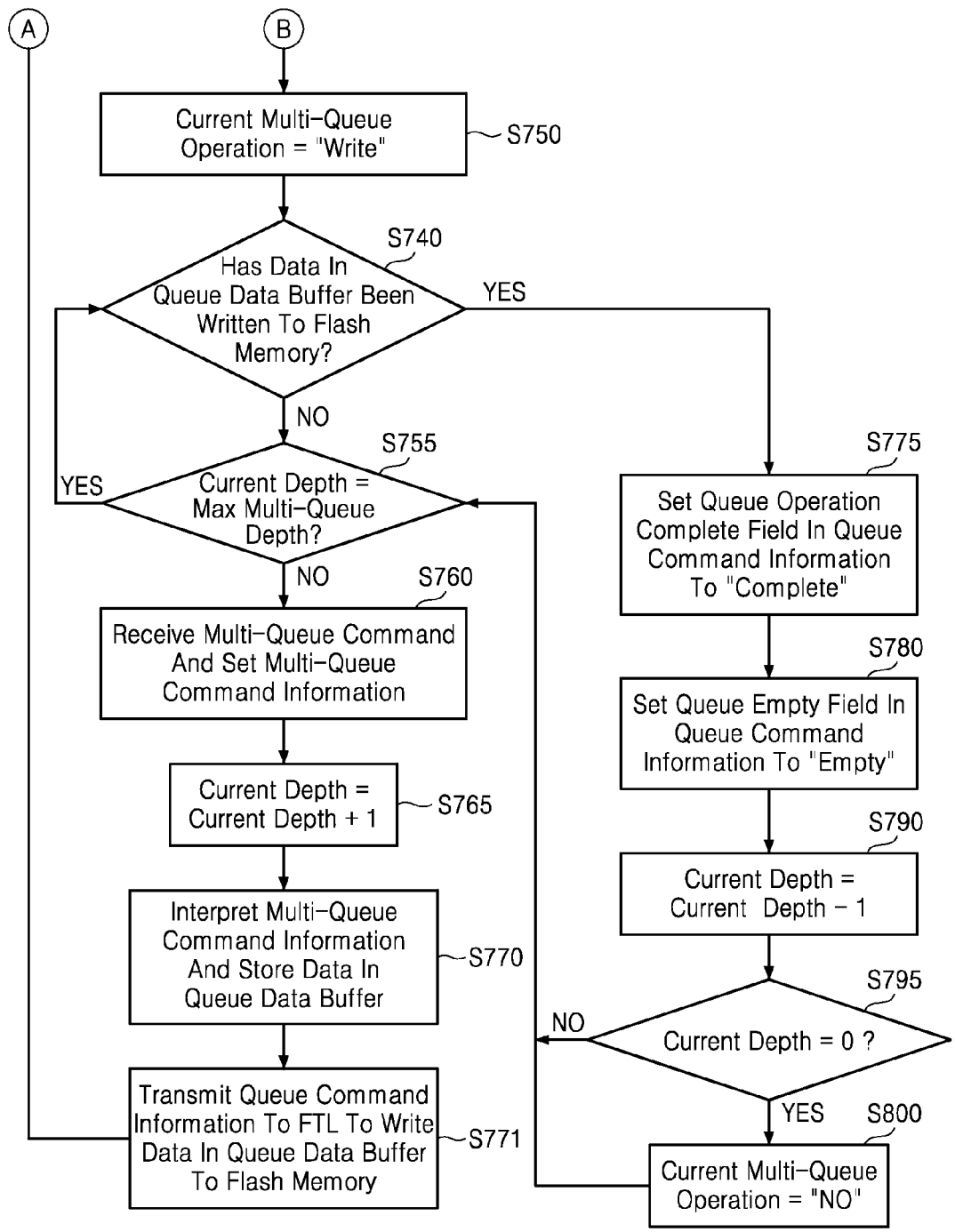

FIG. 12, inclusive of FIGS. 12A and 12B, is a flowchart summarizing one possible method of executing a multi-queue operation using the eMMC system 100 of FIG. 1 according to embodiments of the inventive concept. The method of FIG. 12 may be implemented using firmware. Steps S710, S715, S720, S725 and S731 in the method of FIG. 12 are respectively analogous to steps S210, S215, S220, S225 and S231 in the method of FIG. 9, and a detailed description will be omitted here.

Once the eMMC 300 determines that a multi-queue command has been received from the host 200 (S725=YES), the eMMC 300 next determines whether the multi-queue command is a multi-queue write command (S730). When it is determined that the multi-queue command is a multi-queue write command (S730=YES), the eMMC 300 determines whether the current multi-queue operation flag is set to "NO" or "READ" (S735). If not (S735=NO), the eMMC 300 processes the current operation as a multi-queue write operation error (S745).

Otherwise, the eMMC 300 determines that the received multi-queue command is the multi-queue write command (S735=YES), and sets the current multi-queue operation to "WRITE" (S750). The eMMC 300 next determines whether the current multi-queue depth is equal to a maximum multi-queue depth (S755). When the current multi-queue depth is equal to the maximum multi-queue depth, the eMMC 300 determines whether data stored in one of the queue data buffers 346-1 through 346-M has been completely written to the flash memory 370 (S740). When it is determined that the data stored in one of the queue data buffers 346-1 through 346-M has not been completely written to the flash memory 370 in operation S740, it is determined whether the current multi-queue depth is equal to a maximum multi-queue depth in operation S755.

When the current multi-queue depth is less than the maximum multi-queue depth, that is (S755=NO), the eMMC 300 receives the multi-queue write command from the host 200 and sets multi-queue command information (S760). The eMMC 300 increases the current multi-queue depth by 1 (S765). The eMMC 300 interprets the multi-queue command information using the queue data buffer manager 354 and stores the data received from the host 200 in one of the queue data buffers 346-1 through 346-M (S770). Also, the multi-queue command information is transmitted to the FTL 352 so that the data stored in one of the queue data buffers 346-1 through 346-M to be written to the flash memory 370 (S771).

However, when it is determined that the data stored in one of the queue data buffers 346-1 through 346-M has been completely written to the flash memory 370 (S740=YES), a "queue operation complete" field in the multi-queue command information is set to "COMPLETED" (S775). In addition, a "queue empty" field in the multi-queue command information is set to "EMPTY" in operation S780.

Thereafter, the eMMC 300 decreases the current multi-queue depth by 1 in S790, determines whether the current multi-queue depth is 0 (S795), and sets the current multi-queue operation to "NO" (S800) when the current multi-queue depth is 0.

FIG. 13 is an operating diagram further illustrating the method of FIG. 12 according to embodiments of the inventive concept. First, the queue data buffer manager receives a multi-queue write command and data from the host (S410) and sets queue command information (S405).

The queue data buffer manager transmits the queue command information to an FTL and requests the FTL to write the data to a flash memory (S410). The FTL transmits an address for a program operation to the flash memory (S420) and stores data in a queue data buffer in a page buffer of the flash memory (S430). The FTL transmits a program command to the flash memory (S450). The flash memory programs the data in the page buffer to memory cells in response to the program command. After completion of the program operation, the flash memory generates an interrupt (S455). Then, a queue operation complete field in the queue command information is set to "completed" in an interrupt handler (S470).

Before the data write operation corresponding to the multi-queue write command received from the host (S401) is completed, the queue data buffer manager receives a subsequent multi-queue write command and data (S461) and sets new queue command information (S465).

FIG. 14, inclusive of FIGS. 14A and 14B, is an operating diagram comparing a conventional write operation that may be performed by an eMMC with a multi-queue write operation according to embodiments of the inventive concept. FIG. 14S shows the conventional write operation, and FIG. 14B shows the multi-queue write operation according to an embodiment of the inventive concept.

Referring FIG. 14A, when a host sends a data write command WR or 611 to the eMMC through a command/response line 102, the eMMC sends a response R1 or 612 to the data write command WR or 611 to the host through the command/response line 102. Upon receiving the response R1 or 612, the host transfers data DAT related with the data write command WR or 611 to the eMMC through data bus 103 (621). The eMMC programs the data DAT received from the host to a flash memory. Until the eMMC completes the programming of the data DAT to the flash memory, the eMMC is in a busy state. The eMMC may inform the host of the busy state through one (e.g., DAT[0]) of the data lines of the data bus 103. The host can send a subsequent data write command WR or 614 to eMMC only after standing by (613) until the data writing to the flash memory is completed.

In contrast, referring FIG. 14B, the host 200 sends a first multi-queue write command WR or 631 to the eMMC 300. The eMMC 300 sends to the host 200 a response R1 or 632 to the first multi-queue write command WR or 631.

Upon receiving the response R1 or 6132, the host 200 transfers data DAT related with the first multi-queue write command WR or 631 to the eMMC 300 through the data bus 103 (641) and may also send a second multi-queue write command WR or 633 to the eMMC 300 while transferring the data DAT. The eMMC 300 may receive the second multi-queue write command WR or 633 from the host 200 and send a response R1 or 634 to the host 200 before it completely programs the data DAT related with the first multi-queue write command WR or 631 to the flash memory 370.

In this manner, the host 200 may send as many multi-queue write commands as the maximum multi-queue depth N. For instance, when the multi-queue depth N is 4, the host 200 may send up to four multi-queue write commands.

The eMMC 300 may write data to the flash memory 370 using a parallel operation. For instance, the eMMC 300 may perform in parallel an operation of programming data to the first memory element CE0 of the flash memory 370 and an operation of programming data to the second memory element CE1 of the flash memory 370 using a multi-plane program operation.

As described above, according to some embodiments of the inventive concept, a host is allowed to send a read/write command before an eMMC completes a read/write operation corresponding to a previous read/write command, thereby enabling the eMMC to make preparations for the execution of the read/write command even during the read/write operation. As a result, the read/write performance of the eMMC is increased.

While the inventive concept has been particularly shown and described with reference to exemplary embodiments thereof, it will be understood by those of ordinary skill in the art that various changes in forms and details may be made therein without departing from the scope of the inventive concept as defined by the following claims.

What is claimed is:

1. An embedded multimedia card (eMMC) comprising:
a flash memory; and
an eMMC controller configured to receive a first command from a host, send a first response for the first command to the host, and perform a first operation in response to the first command,
wherein while performing the first operation, the eMMC receives a second command from the host, stores the second command, and sends a second response for the second command to the host,
wherein the first operation comprises at least one among of:
the eMMC controller reading first read data from the flash memory in response to the first command;
the eMMC controller storing the first read data in a first data buffer; and
the eMMC controller transferring the first read data stored in the first data buffer to the host.

2. The eMMC of claim 1, wherein each of the first and second commands is defined according to command information including a command type, an address, and a data size.

3. The eMMC of claim 2, wherein the eMMC controller comprises N command registers, where "N" is an integer greater than 1, and the N command registers include:
a first command information register configured to store first command information associated with the first command; and
a second command information register configured to store second command information associated with the second command.

4. The eMMC of claim 3, wherein the flash memory comprises an extended card specific data (CSD) register that stores a maximum value for N.

5. The eMMC of claim 3, wherein the eMMC controller comprises M data buffers, where M is an integer greater than 1, wherein the M data buffers include a first data buffer configured to store first data associated with the first command, and a second data buffer configured to store second data associated with the second command.

6. The eMMC of claim 5, wherein the command type indicates one of a multi-queue read command and a multi-queue write command.

7. The eMMC of claim 6, wherein the first command information further comprises:
a data buffer pointer indicating one of the M data buffers;
operation complete information indicating whether the first operation is completed; and
register occupancy information indicating whether at least one of the N command registers is empty.

8. The eMMC of claim 6, wherein the first and second commands are respective multi-queue read commands; and
the eMMC controller is further configured to retrieve first read data from the flash memory and store the first read data in the first data buffer in response to the first command, to retrieve second read data from the flash memory and store the second read data in the second data buffer in response to the second command.

9. The eMMC of claim 8, wherein the eMMC controller is further configured to transfer at least a portion of the first read data stored in the first data buffer to the host in response to a third command received from the host following the first and second commands.

10. The eMMC of claim 9, wherein the eMMC controller is further configured to retrieve the first data and the second data from the flash memory using a single multi-plane read command.

11. The eMMC of claim 6, wherein the first and second commands are respective multi-queue write commands; and
the eMMC controller is further configured to store first write data received from host in the first data buffer in response to the first command, and store second write data received from host in the second data buffer in response to the second command.

12. The eMMC of claim 11, wherein the eMMC controller is further configured to program the first write data stored in the first data buffer to the flash memory.

13. The eMMC of claim 12, wherein the eMMC controller receives the second command while programming the first write data to the flash memory.

14. The eMMC of claim 12, wherein a transfer of the first write data from the host to the eMMC controller is performed in parallel with a transfer of the second command from the host to the eMMC controller.

15. The eMMC of claim 11, wherein the eMMC controller is further configured to program the first write data and the second write data to the flash memory in parallel using a multi-plane program command.

16. A method of operating an embedded multimedia card (eMMC) system including a host and an eMMC connected via a clock line, a command/response line, and a data bus, the method comprising:
receiving a first command defining a first operation from the host, and storing the first command in a first command register among N command registers, where "N" is an integer greater than 1;
sending a first response for the first command to the host;
performing the first operation in response to the first command;
receiving a second command defining a second operation from the host;
storing the second command in a second command register among the N command registers; and
sending a second response for the second command to the host, wherein:
receiving the second command, storing the second command, and sending the second response are performed while the first operation is being performed, and
the first operation comprises at least one among of:
reading first read data from a flash memory in response to the first command;
storing the first read data in a first data buffer; and
transferring the first read data stored in the first data buffer to the host.

17. The method of claim 16, further comprising:
retrieving first read data from a flash memory and storing the first read data in a first data buffer in response to the first command, and retrieving second read data from the flash memory and storing the second read data in a second data buffer in response to the second command; and
transmitting the first read data stored in the first data buffer to the host in response to a third command, and transmitting the second read data stored in the second data buffer to the host in response to a fourth command.

18. The method of claim 16, wherein the first and second commands are respective multi-queue write commands, and the method further comprises:
receiving first write data corresponding to the first command from the host and storing the first write data in a first data buffer, and receiving second write data corresponding to the second command from the host and storing the second write data in a second data buffer,
wherein the second command is received from the host by the eMMC while the first write data is being communicated from the host to the eMMC.

19. The method of claim 16, further comprising:
communicating information stored in an extended card specific data (CSD) register of the eMMC from the eMMC to the host to define a value in the host for N.

* * * * *